United States Patent [19]

Kleinerman

[11] 4,287,481

[45] Sep. 1, 1981

[54] DYE LASERS

[76] Inventor: Marcos Kleinerman, 24 Jerome St., Southbridge, Mass. 01550

[21] Appl. No.: 963,157

[22] Filed: Nov. 22, 1978

[51] Int. Cl.³ .............................................. H01S 3/20
[52] U.S. Cl. ........................... 331/94.5 L; 252/301.17
[58] Field of Search .............. 331/94.5 L; 252/301.17, 252/301.16; 260/150, 151

[56] References Cited

PUBLICATIONS

O'Leary, Optics Communications, Aug. 1975, vol. 14, No. 4, pp. 392–394.

Majewski et al., Optics Communications, Aug. 1976, vol. 18, No. 3, pp. 255–259.

*Primary Examiner*—William D. Larkins

[57] ABSTRACT

Certain inexpensive industrial dyes are used in solution with non-interfering solvents as new lasing media in dye lasers.

7 Claims, No Drawings

DYE LASERS

BACKGROUND OF THE INVENTION

1. Field of Invention

The present invention relates to dye lasers and, more particularly, is directed towards new lasing media for use in dye lasers.

2. Description of the Prior Art

Among the different kinds of lasers, dye lasers are unique by virtue of their relatively broad tuning range, which can exceed 50 nanometers with a single dye. By using different dyes in a single laser instrument it is possible to cover a broad, continuous range from the ultraviolet to the near infrared regions.

One present disadvantage of most dyes used in lasing media is the relatively short useful dye lifetime, which requires frequent replacement of the dye. At current laser dye prices the cost of dye during the useful lifetime of a dye laser instrument can greatly exceed the cost of the instrument itself.

Another difficulty with most laser dyes is that they require solvents having relatively poor thermo-optical properties compared to water, which cause a degradation of the laser performance of the dyes, especially at high energy loadings.

Accordingly, there is a need for efficient laser dyes with a high output-to-cost ratio, and there is also a need for laser dyes which can perform efficiently when dissolved in water.

One object of this invention is to provide new, efficient, inexpensive dye lasers.

Another object of this invention is to provide new laser dyes which can lase efficiently in aqueous solutions.

As used herein, the term "dye" refers to a molecular entity which can absorb electromagnetic radiation of wavelength longer than 300 nanometers (nm). The term "fluorescent dye" refers to a dye which can be made to emit light from its lowest excited singlet level, and the term "fluorogenic dye" refers to a dye which can be easily converted into a fluorescent dye by a simple chemical step like, for instance, the attachment of a metal cation.

While the processes which result in dye laser action are essentially understood, such understanding is not sufficient to enable a scientist to predict the laser parameters of any given dye from the knowledge of its molecular structure, fluorescence emission spectrum, electronic transition probability and fluorescence quantum efficiency. While a high fluorescence quantum efficiency and a high electronic transition probability are generally required for efficient laser action, many dyes meeting these two requirements do not lase, or lase too inefficiently to be useful. For instance the dye Rubrene has a fluorescence quantum efficiency of nearly unity in a number of solvents, but it does not lase in any of them. Often a dye with a high fluorscence efficiency, which is structurally similar to an efficient laser dye, fails to exhibit laser action, or lases inefficiently. For instance, the $Al^{3+}$ chelate of the pentahydroxyflavone dye Quercetin does not lase, in contrast to the $Al^{3+}$ chelate of the structurally very similar pentahydroxy flavone dye Morin.

It follows, then, that while the search for new, efficient laser dyes has to be guided by basic physical principles, a substantial amount of trial and error work is also required.

SUMMARY OF THE INVENTION

I have found that new, efficient, relatively inexpensive laser dyes can be obtained from among fluorescent and fluorogenic dyes produced in large volumes for the industrial dyeing of fabrics, paper, plastics and other polymeric materials. These laser dyes include also some chemical intermediates for the manufacture of such industrial dyes. Successful fluorescent dyes manufactured for these purposes must have, among other requirements, a high fluorescence quantum efficiency. Both the fluorescent and the fluorogenic dyes must also have good photochemical stability. Useful laser dyes must meet these requirements, too. It was expected, therefore, that a number of such industrial dyes would make good laser dyes. Such was found to be the case.

In addition, it was found that some of these dyes are amenable to a simple chemical modification to yield other new, useful laser dyes.

Most of the dyes of this invention have known molecular structures. Any dye whose molecular structure is not precisely known is defined by its Color Index (CI) designation, which is specific for each dye.

DESCRIPTION OF THE PREFERRED EMBODIMENTS

All the dyes object of this invention are members of the group of dyes which have (a) a high molecular electronic transition probability between their ground singlet levels and their first excited singlet levels;

(b) a relatively low rate of radiationless decay from said excited singlet levels, thus permitting a relatively large population inversion between said excited singlet levels and the ground levels under intense optical excitation; and (c) a relatively small extent, if any, of processes which compete with amplification of the fluorescence from said excited singlet levels along the direction of laser action.

These dyes include, among others, fluorescent metal chelates of some organic ligands, whether or not said ligands are fluorescent by themselves. One important class of said ligands has the following structure

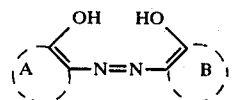

wherein A and B represent groups of non-metallic atoms needed to complete an aromatic cyclic structure, said cyclic structure being selected from the group consisting of a benzene nucleus, a naphthalene nucleus and a heterocyclic nucleus.

Said ligands belong to the class of dyes known in the textile industry as Mordant Dyes. Selected fluorescent chelates of some of these Mordant Dyes are described in embodiments 1 to 12. All of them can lase in water and in other non-interfering solvents.

Embodiments 13 to 17 describe some ligands which can lase with or without an attached metal cation.

Embodiments 18 to 20 describe some inexpensive fluorescent brighteners as new lasing media. Other fluorescent brighteners, like 7-diethylamino-4-methyl coumarin have been used as laser dyes in the prior art.

Another group of useful laser dyes which are part of this invention are provided by perylene derivatives having the following structure

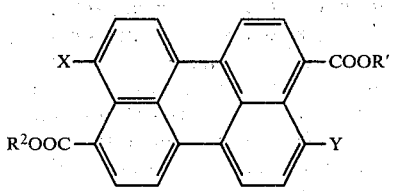

wherein,

R¹ and R² each represent an atom or radical which does not absorb visible light, said atom or radical being chosen from the group consisting of a hydrogen atom, an alkyl radical, an aryl radical or a monovalent cation; and X and Y each represent a hydrogen atom or a —COOR³ radical, wherein R³ represents an atom or radical which does not absorb visible light, said atom or radical being chosen from the group consisting of a hydrogen atom, an alkyl radical, an aryl radical or a monovalent cation.

Selected laser dyes from this group are described in embodiments 21 to 23.

Other new, efficient, laser dyes which are part of this invention are provided by the class of non-ionic 1,8 naphthalimides having the structure

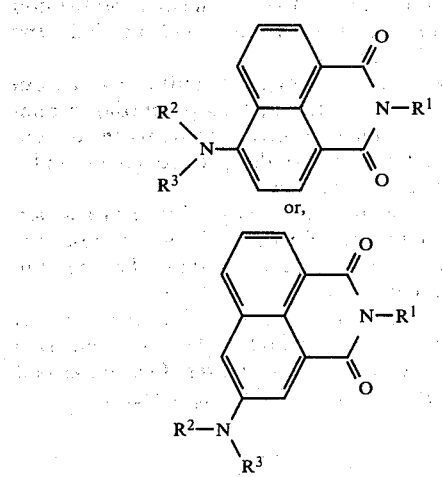

wherein,

R¹ represents a hydrogen atom or a radical which does not absorb visible light; and R² and R³ each represent a hydrogen atom, an alkyl group or a

radical, wherein R⁴ is an alkyl group or a monocyclic aryl group, subject to the limitation that when R² is a

radical, then R is a hydrogen atom, and vice versa.

Two relatively inexpensive industrial dyes belonging to this class are 4 amino 1,8 naphthalimide and the dye CI Solvent Yellow 44 which has the following structure

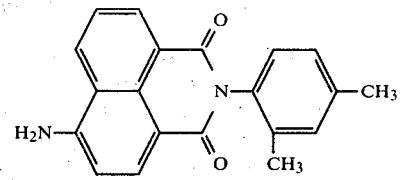

They both lase at about 550 nm. It is often desired to shift the lasing wavelength of a given dye to a different spectral region without an appreciable decrease in lasing efficiency. There is, for instance, a need for useful, stable and inexpensive laser dyes operating in the blue-green region of the spectrum for minimum beam attenuation through sea water. Such dyes are provided in this invention by substituting one hydrogen atom in the amino group of either dye by the acetyl radical

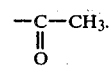

The new dyes lase at about 495 nm.

Acetylation of aromatic amines can be accomplished by simple, well-known techniques, such as those described in Vogel's *Textbook of Practical Organic Chemistry*, 3rd Edition, 1956 (Langman's), page 576.

Selected examples of dye lasers using said naphthalimide dyes are described in embodiments 24 to 27.

Embodiments 28 to 34 describe other laser media based on various industrial dyes.

Embodiment 1

The dye CI Mordant Red 5 having the structure

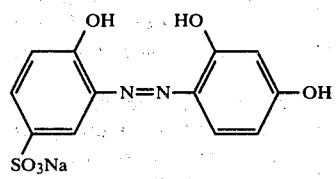

is dissolved to a concentration of approximately $10^{-3}$ M in hot water containing 1 percent of AlCl₃ and 2 percent of the surface active agent Triton X-100 (octyl phenoxy polyethoxy ethanol). The solution is allowed to cool and is placed in a 1 cm spectrophotometric square cuvette having all four sides optically polished. The solution is pumped with a $2 \times 10^{-3}$ joule nitrogen laser pulse focused on one side of the cuvette to a line about 0.2 millimeters wide perpendicular to the two adjacent sides of the cuvette. The dye lases superradiantly along said line at a peak wavelength of about 625 nanometers (nm).

Embodiment 2

Embodiment 1 is repeated except that the solvent is dimethyl sulfoxide (DMSO) containing 1 percent AlCl₃ and 10 percent water. The dye lases superradiantly at about 640 nm.

Embodiment 3

Embodiment 1 is repeated except that the dye is Lumogallion, having the following structure

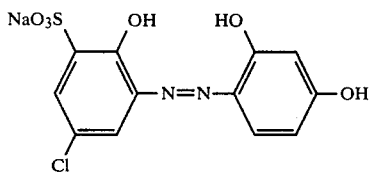

The dye lases superradiantly at about 625 nm.

Embodiment 4

Embodiment 2 is repeated, except that the dye is Lumogallion. The dye lases superradiantly at about 630 nm.

Embodiment 5

Embodiment 1 is repeated except that the dye is CI Mordant Blue 9 having the structure

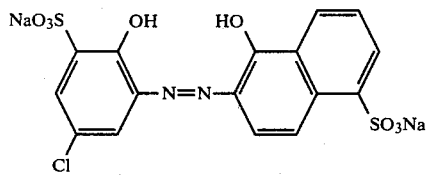

The dye lases superradiantly at about 655 nm.

Embodiment 6

Embodiment 2 is repeated except that the dye is CI Mordant Blue 9. The dye lases superradiantly at about 660 nm.

Embodiment 7

Embodiment 1 is repeated except that the dye is CI Mordant Blue 13 having the structure

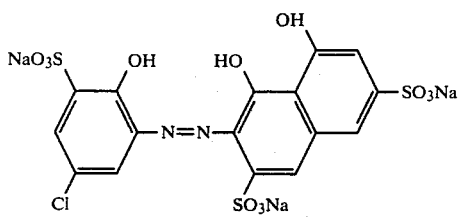

The dye lases superradiantly at about 690 nm.

Embodiment 8

Embodiment 2 is repeated except that the dye is CI Mordant Blue 13. The dye lases superradiantly at about 690 nm.

Embodiment 9

Embodiment 1 is repeated except that the dye is CI Mordant Violet 5 having the structure

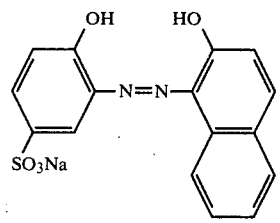

The dye lases superradiantly at about 695 nm.

Embodiment 10

Embodiment 2 is repeated except that the dye is CI Mordant Violet 5. The dye lases superradiantly at about 695 nm.

Embodiment 11

Embodiment 2 is repeated except that the dye is Flazo Orange, having the following structure

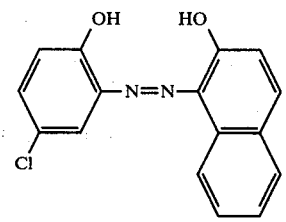

The dye lases superradiantly at about 712 nm.

Embodiment 12

Embodiment 2 is repeated, except that the dye is CI Mordant Black 3 having the structure

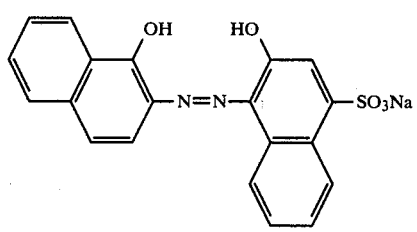

and a flat mirror with a reflectivity of 0.8 is attached to one side of the cuvette perpendicular to the pumped side. The dye lases at about 725 nm.

Embodiment 13

A $5 \times 10^{-3}$ M solution of the dye 3,6-dihydroxyphthalimide in a solvent consisting of 1 part $H_2O$, 9 parts DMSO and 1 percent $AlCl_3$ is pumped with a nitrogen laser pulse as described in embodiment 1. The solution lases at about 510 nm.

Embodiment 14

Embodiment 13 is repeated, except that the dye is 2-amino isophthalic acid. The solution lases at about 415 nm.

Embodiment 15

A $5 \times 10^{-3}$ M solution of the dye 3,6-dihydroxyphthalimide in DMSO is pumped as described in embodiment 1. The dye lases at about 450 nm.

Embodiment 16

Embodiment 15 is repeated, except that the dye is 2-amino isophthalic acid. The dye lases at about 415 nm.

Embodiment 17

A $10^{-3}$ M solution of the dye 3 cyano-4,6 dimethyl-2-hydroxypyridine in water containing 2 percent Triton X100 is pumped with a nitrogen laser pulse as described in embodiment 1. The dye lases superradiantly in the ultraviolet region at about 377 nm.

Embodiment 18

A $10^{-3}$ M DMSO solution of the dye CI Fluorescent Brightener 47 having the structure is excited with a nitrogen laser pulse as described in embodiment 1. The dye lases superradiantly at a wavelength of about 455 nm.

Embodiment 19

0.02 g of the dye CI Fluorescent Brightener 162, a derivative of 1,8 Naphthalimide, is dissolved in 5 ml DMSO. The solution is excited with a nitrogen laser pulse as described in embodiment 1. The dye lases superradiantly at a wavelength of about 473 nm.

Embodiment 20

A $10^{-3}$ M DMSO solution of the dye CI Fluorescent Brightener 185 having the structure is pumped as described in embodiment 1. The dye lases at a wavelength of about 428 nm.

Embodiment 21

A saturated solution of the dye perylene 3,4,9,10 tetracarboxylic acid tetrasodium salt in water is pumped as described in embodiment 1. The dye lases at about 512 nm.

Embodiment 22

Embodiment 21 is repeated except that the dye is perylene 3,9 dicarboxylic acid disodium salt. The dye lases at about 500 nm.

Embodiment 23

The dye CI Solvent Green 5, CI No. 59075, which is the di-isobutyl ester of perylene 3,9 dicarboxylic acid, is dissolved in toluene to a concentration of about $5 \times 10^{-3}$ M and pumped as described in embodiment 1. The dye lases at a wavelength of about 510 nm.

Embodiment 24

A $10^{-2}$ M solution of the dye 4 amino 1,8 naphthalimide in DMSO is pumped as described in embodiment 1. The dye lases at about 550 nm.

Embodiment 25

A $10^{-3}$ M solution in DMSO of the dye 4-acetamido-1,8-naphthalimide, prepared by the acetylation of 4-amino-1,8-naphthalimide, is pumped as described in embodiment 1. The dye lases at about 495 nm.

Embodiment 26

The dye CI Solvent Yellow 44, whose molecular structure is is dissolved in DMSO to about $10^{-2}$ M. The solution is pumped as described in embodiment 1. The dye lases at about 555 nm.

Embodiment 27

A $10^{-3}$ M solution in DMSO of the dye prepared by the acetylation of Solvent Yellow 44 is pumped as described in embodiment 1. The dye lases at about 495 nm.

Embodiment 28

0.01 g of the dye CI Solvent Yellow 43 is dissolved in 5 ml of DMSO and pumped as described in embodiment 1. The dye lases at about 550 nm.

Embodiment 29

0.01 g of the dye CI Solvent Yellow 85 is dissolved in 5 ml of DMSO and pumped as described in embodiment 1. The dye lases at about 550 nm.

Embodiment 30

0.01 g of the dye CI Solvent Yellow 98 is dissolved in 5 ml of toluene and pumped as described in embodiment 1. The dye lases at about 540 nm.

Embodiment 31

0.01 g of the dye CI Disperse Yellow 65 is dissolved in 10 ml of DMSO and pumped as described in embodiment 1. The dye lases at about 610 nm.

Embodiment 32

0.01 g of the dye CI Disperse Yellow 82 is dissolved in 5 ml of DMSO and pumped as described in embodiment 1. The dye lases at about 520 nm.

Embodiment 33

A $10^{-3}$ M solution in DMSO of the dye CI Disperse Yellow 105, having the structure

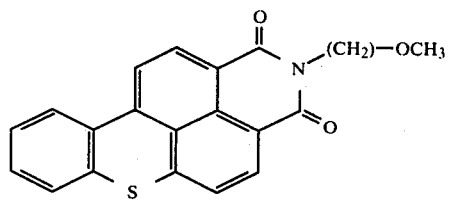

is pumped as described in embodiment 1. The dye lases at about 565 nm.

Embodiment 34

0.01 g of the coumarin dye CI Acid Yellow 227 is dissolved in 5 ml of DMSO and pumped as described in embodiment 1. The dye lases at about 520 nm.

While all the described embodiments are specific with respect to pumping source, laser dye concentration and the nature of the solvent, it should be understood that other pumping sources, dye concentrations and solvents can be used to achieve population inversion and laser action from the dyes object of this invention. It is therefore to be understood that within the scope of the appended claims the invention may be practiced otherwise than as specifically described.

I claim:

1. A dye laser comprising a laser dye solution and a pumping energy source operably coupled therewith and capable of producing stimulated emission of the dye solution, said dye solution comprising a lasing concentration of a dye in a noninterfering solvent, said dye being selected from the group of Aluminum complexes of organic compounds having the formula

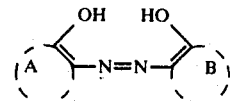

wherein A and B each represent groups of non-metallic atoms necessary to complete an aromatic cyclic structure, said compounds selected from the group consisting of the dyes Lumogallion, CI Mordant Blue 9, CI Mordant Blue 13, Flazo Orange, CI Mordant Violet 5 and CI Mordant Black 3.

2. The dye laser of claim 1, wherein said compound is Lumogallion.

3. The dye laser of claim 1, wherein said compound is CI Mordant Blue 9.

4. The dye laser of claim 1, wherein said compound is CI Mordant Blue 13.

5. The dye laser of claim 1, wherein said compound is Flazo Orange.

6. The dye laser of claim 1, wherein said compound is CI Mordant Violet 5.

7. The dye laser of claim 1, wherein said compound is CI Mordant Black 3.